(12) United States Patent (10) Patent No.: US 8,534,555 B1
Sweet et al. (45) Date of Patent: Sep. 17, 2013

(54) RECONFIGURATION OF A CARD READER FOR WAKE-ON-SWIPE

(71) Applicants: Dan Sweet, Lynnwood, WA (US); Triton Hurd, San Francisco, CA (US)

(72) Inventors: Dan Sweet, Lynnwood, WA (US); Triton Hurd, San Francisco, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/722,766

(22) Filed: Dec. 20, 2012

Related U.S. Application Data

(60) Provisional application No. 61/665,033, filed on Jun. 27, 2012, provisional application No. 61/647,203, filed on May 15, 2012.

(51) Int. Cl.
  *G06K 7/08*  (2006.01)
  *G06K 5/00*  (2006.01)
  *G06K 19/00*  (2006.01)
  *G06K 19/06*  (2006.01)
  *G05F 7/00*  (2006.01)

(52) U.S. Cl.
  USPC .......... 235/449; 235/376; 235/380; 235/487; 235/492; 235/493

(58) Field of Classification Search
  USPC .................. 235/449, 376, 380, 487, 492, 493
  See application file for complete search history.

(56) References Cited

U.S. PATENT DOCUMENTS

| | | | | |
|---|---|---|---|---|
| 4,304,992 A * | 12/1981 | Kobayashi et al. | ........... | 235/449 |
| 4,788,420 A * | 11/1988 | Chang et al. | ................... | 235/483 |
| 5,247,164 A | 9/1993 | Takahashi | | |
| 5,308,959 A * | 5/1994 | Cherry | ............................ | 235/379 |
| 5,603,078 A * | 2/1997 | Henderson et al. | ................ | 725/6 |
| 5,650,606 A * | 7/1997 | Baus, Jr. | .......................... | 235/449 |
| 5,834,756 A * | 11/1998 | Gutman et al. | ................ | 235/493 |
| 5,870,155 A * | 2/1999 | Erlin | ................................ | 348/734 |
| 5,877,483 A * | 3/1999 | Bilich et al. | ................... | 235/382 |
| 6,497,368 B1 | 12/2002 | Friend | | |
| 6,535,136 B1 | 3/2003 | Rodenbeck | | |
| 6,698,654 B1* | 3/2004 | Zuppicich | ....................... | 235/380 |
| 6,772,946 B2* | 8/2004 | Ruat et al. | ....................... | 235/451 |
| 7,163,148 B2 | 1/2007 | Durbin | | |
| 7,185,806 B2* | 3/2007 | Sines | ............................ | 235/380 |
| 7,430,674 B2* | 9/2008 | von Mueller et al. | .......... | 713/300 |
| 8,226,001 B1* | 7/2012 | Foo et al. | ....................... | 235/449 |
| 8,313,037 B1* | 11/2012 | Humphrey | .................... | 235/493 |
| 2002/0032657 A1* | 3/2002 | Singh | ............................... | 705/44 |
| 2002/0043562 A1* | 4/2002 | Zazzu et al. | ................... | 235/457 |

(Continued)

FOREIGN PATENT DOCUMENTS

| | | |
|---|---|---|
| EP | 38386 A1 | 10/1981 |
| GB | 1294608 A | 11/1972 |

OTHER PUBLICATIONS

ID Tech; DualMag User Manual; Cypress California; Jan. 9, 2012.

*Primary Examiner* — Daniel Walsh

(57) ABSTRACT

An apparatus includes a reconfigurable stripe reader configured to receive read head signals corresponding to states on a magnetic stripe. The reconfigurable stripe reader can have a first configuration with a first routing of the read head signals to detect an initiation of a swipe of the magnetic stripe from the read head signals. The reconfigurable stripe reader can have a second configuration with a second routing of the read head signals to read data stored on the magnetic stripe from the read head signals during the swipe of the magnetic stripe.

18 Claims, 10 Drawing Sheets

(56) References Cited

U.S. PATENT DOCUMENTS

| | | |
|---|---|---|
| 2003/0117734 A1* | 6/2003 | Yokozawa et al. ............... 360/2 |
| 2004/0133787 A1* | 7/2004 | Doughty et al. ............... 713/186 |
| 2005/0194452 A1* | 9/2005 | Nordentoft et al. ............ 235/492 |
| 2005/0247787 A1* | 11/2005 | Von Mueller et al. ......... 235/449 |
| 2006/0032906 A1* | 2/2006 | Sines ............................. 235/380 |
| 2006/0043180 A1* | 3/2006 | Ison et al. ...................... 235/442 |
| 2009/0159671 A1* | 6/2009 | Mullen et al. .................. 235/380 |
| 2011/0084138 A1* | 4/2011 | Akahane ........................ 235/449 |
| 2011/0084139 A1* | 4/2011 | McKelvey et al. ............. 235/449 |
| 2012/0002313 A1* | 1/2012 | Miyabe et al. ..................... 360/2 |
| 2012/0126010 A1 | 5/2012 | Babu |
| 2012/0138683 A1* | 6/2012 | Sather et al. ................... 235/449 |
| 2012/0187199 A1* | 7/2012 | Poidomani et al. ............ 235/492 |

* cited by examiner

RECONFIGURATION OF A CARD READER FOR WAKE-ON-SWIPE

RELATED APPLICATIONS

This patent application claims priority to U.S. Provisional Patent Application No. 61/665,033, filed Jun. 27, 2012, and U.S. Provisional Patent Application No. 61/647,203, filed May 15, 2012, both of which is incorporated by reference herein.

TECHNICAL FIELD

This disclosure relates generally to electronic systems, and, more particularly, to reconfiguration of a card reader for wake-on-swipe.

BACKGROUND

Many electronic systems include card readers to read data encoded on a magnetic stripe of a card. The magnetic stripe typically can include 3 separate tracks, each capable of including data, which the card reader can concurrently read during a card swipe over a read head of the card reader.

Since most card readers are used sporadically, the electronic systems can allow the card readers to enter a low power mode during periods of inactivity. The electronic systems can separately include swipe detection circuitry to detect an initiation of a card swipe and prompt the electronic systems to a wake-up the card reader to read the data encoded on the magnetic stripe of the card during the swipe of the card. While the inclusion of the separate swipe detection circuitry can allow the card reader to reduce power consumption, it comes at the cost of increase utilization of hardware and routing resources in the electronic systems. Some electronic systems, in an attempt to reduce the impact of the swipe detection circuitry on system resources, have elected to design swipe detection circuits that monitor only 1 of the 3 tracks on the magnetic stripe. While this solution allowed for reduced system resource consumption, the accuracy of the swipe detection circuitry can be compromised because some cards leave tracks unpopulated.

DETAILED DESCRIPTION

An electronic system can include a card reader to read data stored on a card, for example, encoded on a magnetic stripe of the card, during a normal operating mode. The electronic system also can operate in a low power mode, which can shutdown portions of the card reader. As discussed above, previous systems included separate swipe detection circuitry to monitor a read head for swipe activity that could prompt a wake-up of a card reader into the normal operating mode. This application discloses a reconfigurable card reader that can have a first configuration to detect an initiation of a card swipe from read head signals and have a second configuration to read data stored on the card from the read head signals during the card swipe. By utilizing a portion of the card reader to perform swipe detection, while the card reader is in a low power mode, the reconfigurable card reader can perform swipe detection without additional swipe detection circuitry. Embodiments are shown and described below in greater detail.

Figure 1:
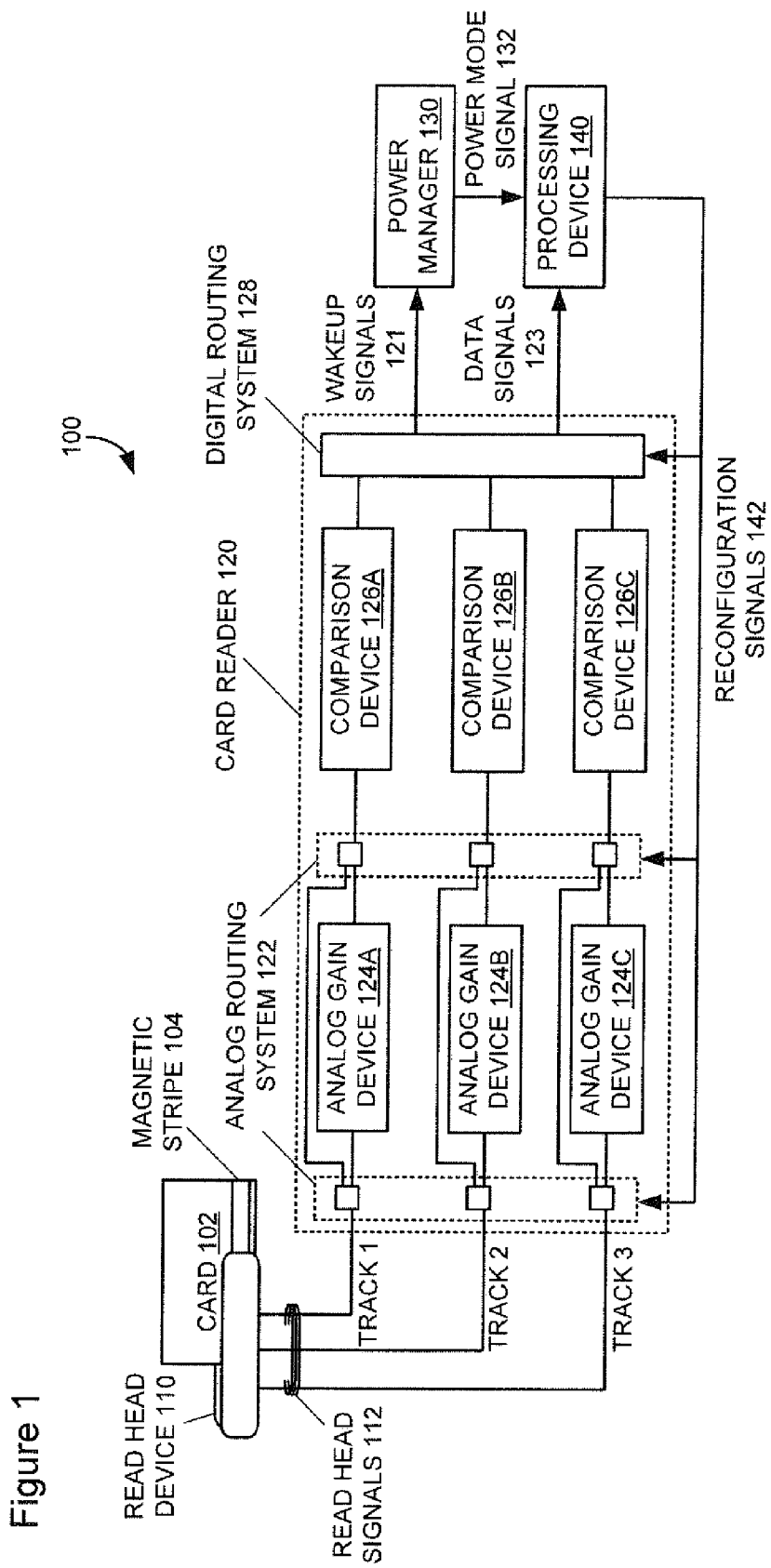
FIG. 1 is a block diagram example of a magnetic card reading system.

FIG. 1 is a block diagram example of a magnetic card reading system 100. Referring to FIG. 1, the magnetic card reading system 100 can include a read head device 110 to detect magnetic states encoded on a magnetic stripe 104 of a card 102. In some embodiments, the magnetic stripe 104 can include three magnetic tracks, each capable of storing data, for example, based on the encoded magnetic states. The read head device 110 can generate read head signals 112 based on the detected magnetic states encoded on the magnetic stripe 104 of the card 102. Although FIG. 1 shows the magnetic stripe 104 being located on a card 102, in some embodiments, the magnetic stripe 104 can be located on any medium capable of being read by the read head device 110.

The magnetic card reading system 100 can include a card reader 120 to receive the read head signals 112 from the read head device 110. The card reader 120 can operate in multiple operational modes, such as a normal operating mode and a low power operating mode. In the normal operating mode, the card reader 120 can read data stored on the card from the read head signals 112 generated during the card swipe. In some embodiments, the card reader 120 can utilize the read head signals 112 to ascertain data stored on the magnetic stripe 104 of the card 102 and generate the data signals 123 corresponding to the data read by the card reader 120. Embodiments of reading data stored on the magnetic stripe 104 of the card 102 will be described below in greater detail.

The card reader 120 can output the data signals 123 to a processing device 140, which can store and/or process the data signals 123 depending on an application implemented by the processing device 140. For example, when the card 102 is a credit card, the data signals 123 can correspond to credit account information, which the processing device 140 can utilize to authenticate and/or authorize payment in a transaction. When the card 102 is a security card, the data signals 123 can corresponding to user access information, which the processing device 140 can utilize to authenticate and/or authorize a user for access to a secure location or resource.

The processing device 140 prompt the card reader 120 to transition into a low power mode, for example, after having received the data signals 123 from the card reader 120. In some embodiments, the processing device 140 can generate reconfiguration signals 142, which can prompt the card reader 120 to reconfigure into the lower power mode. The processing device 140 also can alter a power supply provided to the card reader 120 during or after the operational mode transition.

In a low power mode, the card reader 120 can be configured to detect an initiation of a swipe of the card 102 in the read head device 110 based on the read head signals 112, and generate wakeup signals 121 that indicate whether the initiation of the swipe of the card 102 in the read head device 110 was detected. The card reader 120 can output the wakeup signals 121 to a power manager 130, which can generate a power mode signal 132 in response to the wakeup signals 121. The processing device 140, in response to the power mode signal 132, can initiate a transition of the card reader 120 from the low power state to the normal operating mode in order to allow the card reader 120 to read data stored on the card 102 during the remainder of the card swipe. In some embodiments, the processing device 140 can generate reconfiguration signals 142, which can prompt the card reader 120 to reconfigure into the normal operating mode. The processing device 140 also can alter the power supply provided to the card reader 120 during or after the operational mode transition.

The card reader 120 can include an analog routing system 122 to selectively configure the card reader 120 in a normal operating mode or in a low power mode. The analog routing system 122 can receive the read head signals 112 from the read head device 110 and selectively route the read head signals 112 to analog gain devices 124A-124C or to comparison devices 126A-126C based on the operational mode of the card reader 120.

In the normal operating mode, the analog routing system 122 can provide the read head signals 112 to analog gain devices 124A-124C. In some embodiments, the analog gain devices 124A-124C can receive different subsets of the read head signals 112, for example, each corresponding to different magnetic tracks on the magnetic stripe 104.

The analog gain devices 124A-124C can adjust amplitudes or magnitudes of the read head signals 112. In some embodiments, since the amplitude of the read head signals 112 can depend on a speed in which the card 102 and corresponding magnetic stripe 104 are swiped through the read head device 110, the analog gain device 124A-124C can adjust the amplitudes or magnitudes of the read head signals 112 to account for different swipe speeds—both inter-swipe or intra-swipe.

The analog routing system 122 can provide the adjusted read head signals to respective comparison devices 126A-126C. The comparison devices 126A-126C can detect peaks, high and/or low, of the adjusted read head signals, which can correspond to transitions between different magnetic states on the magnetic stripe 104. In some embodiments, the frequency of peaks detected in the adjusted read head signals can correspond to different binary states. For example, a binary "1" can have twice a number of peaks detected within a bit-period of the adjusted read head signals than a binary "0". The comparison devices 126A-126C can generate the data signals 123 based on the detected peaks.

In the low power mode, the analog routing system 122 can provide the read head signals 112 directly to the comparison devices 126A-126C. Since the analog routing system 122 can bypass the analog gain devices 124A-124C in the card reader 120, the magnetic card reading system 100 can reduce or shut-off power to the analog gain devices 124A-124C, while in the low power mode. In some embodiments, the comparison devices 126A-126C can receive different subsets of the read head signals 112, for example, each corresponding to different magnetic tracks on the magnetic stripe 104.

The comparison devices 126A-126C can detect activity on the read head device 110, such as an initiation of a card swipe. In some embodiments, the magnetic stripe 104 on the card 102 can include a preamble, for example, multiple consecutive magnetic states, such as leading zeros, which can allow the card reader 120 synchronize with the magnetic strip 104 prior to reading the data stored on the tracks of the magnetic stripe 104. The comparison devices 126A-126C can detect at least a portion of the preamble as the initiation of the card swipe and generate the wakeup signals 121 based on the detected initiation of the card swipe.

The card reader 120 can include a digital routing system 128 to selectively forward the output from the comparison devices 126A-126C based on the operational mode the card reader 120. For example, the digital routing system 128 can provide the output from the comparison devices 126A-126C to the power manger 130 as the wakeup signals 121 in the low power mode, and the output from the comparison devices 126A-126C to the processing device 140 as the data signals 123 in the normal operating mode.

The processing device 140 can utilize reconfiguration signals 142 to prompt the card reader 120 to change between the normal operating mode and the low power mode, for example, by having the analog routing system 122 and the digital routing system 128 reconfigure routing in the card reader 120. This dynamic reconfiguration of the card reader 120 can allow the card reader 120 to read data from read head signals 112 during the normal operating mode and then reuse at least a portion of the comparison devices 126A-126C during the low power mode to implement a swipe detection circuit. In some embodiments, the card reader 120 can directly change between the normal operating mode and the low power mode, while in other embodiments, the card reader 120 can transition to intermediate states or modes, such as a reset mode, while changing between the normal operating mode and the low power mode.

Figure 2:
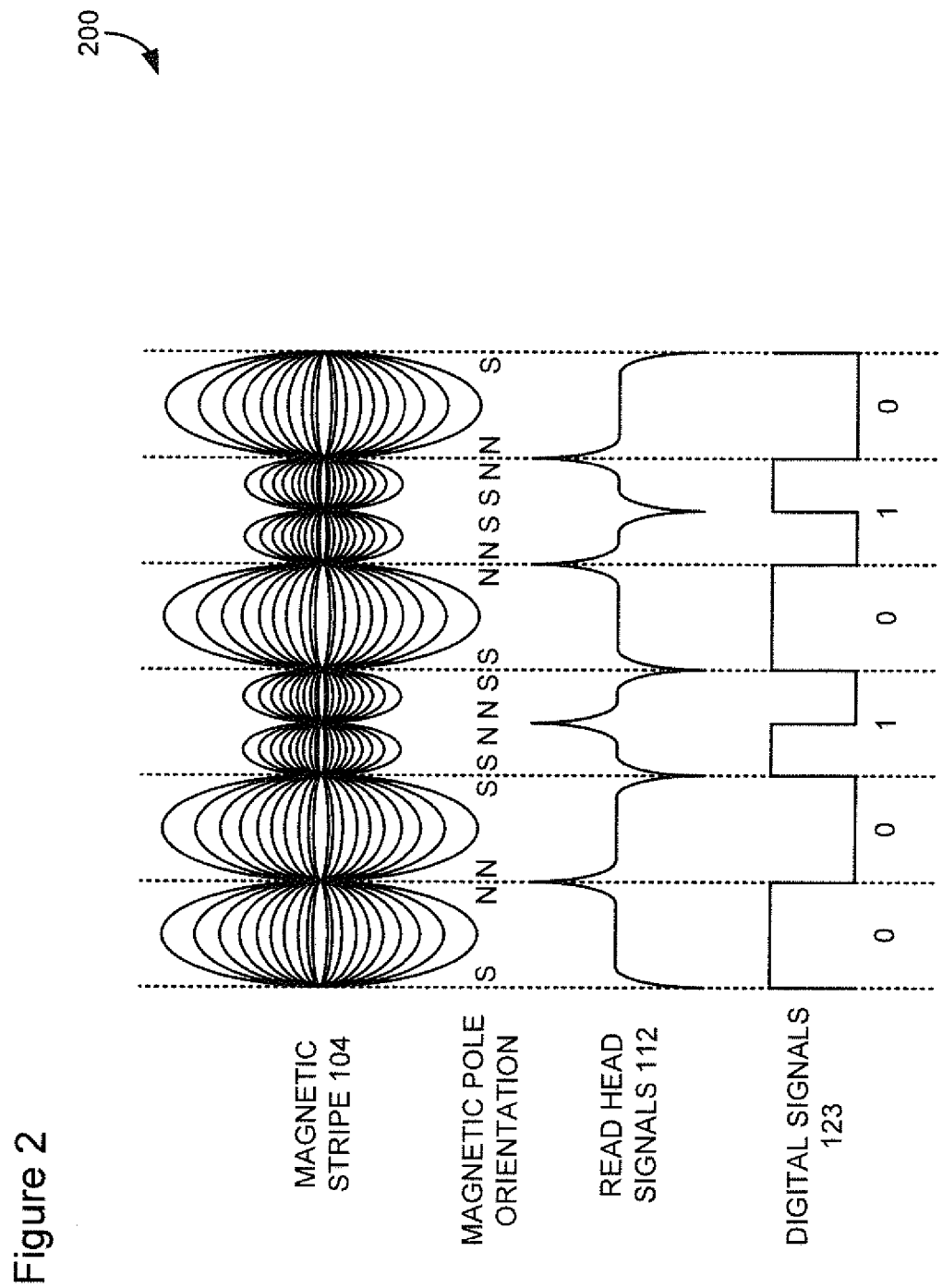
FIG. 2 is an example graph illustrating magnetic stripe reading by the magnetic card reading system shown in FIG. 1.

FIG. 2 is an example graph illustrating magnetic stripe reading by the magnetic card reading system 100 shown in FIG. 1. Referring to FIG. 2, the magnetic strip 104 can be composed of a string of magnetic domains, each oriented having similar poles adjacent to each other. For example, the magnetic stripe 104 is shown as having north N poles of adjacent domains and south S poles of adjacent domains located next to each other. This alignment of similar adjacent poles, can provide a concentration of magnetic flux, which can induce current spikes as the magnetic domains pass through the magnetic read head device 110.

The read head signals 112 can have a waveform, either current-based or voltage-based, which can have peaks in locations corresponding to a transition between magnetic domains. These peaks also can have a magnitude or amplitude based on the polarity of the magnetic poles at the transition between magnetic domains. In some embodiments, the card reader 120, operating in a normal operating mode, can generate the digital signals 123 from the read head signals 112. The magnetic strip 104 can be encoded with frequency/double frequency (F2F) encoding or Aiken BiPhase encoding, with each bit of data having the same physical length on the magnetic strip 104, known as a bit period, and the presence or absence of an additional peak in the middle of the bit period determines whether the read head signal 112 corresponds to a "1" or a "0". The digital signals 123 can indicate a binary "0", for example, when the read head signals 112 include a single transition in a bit period, and indicate a binary "1", for example, when the read head signals 112 include two transitions in a bit period.

Figure 3:
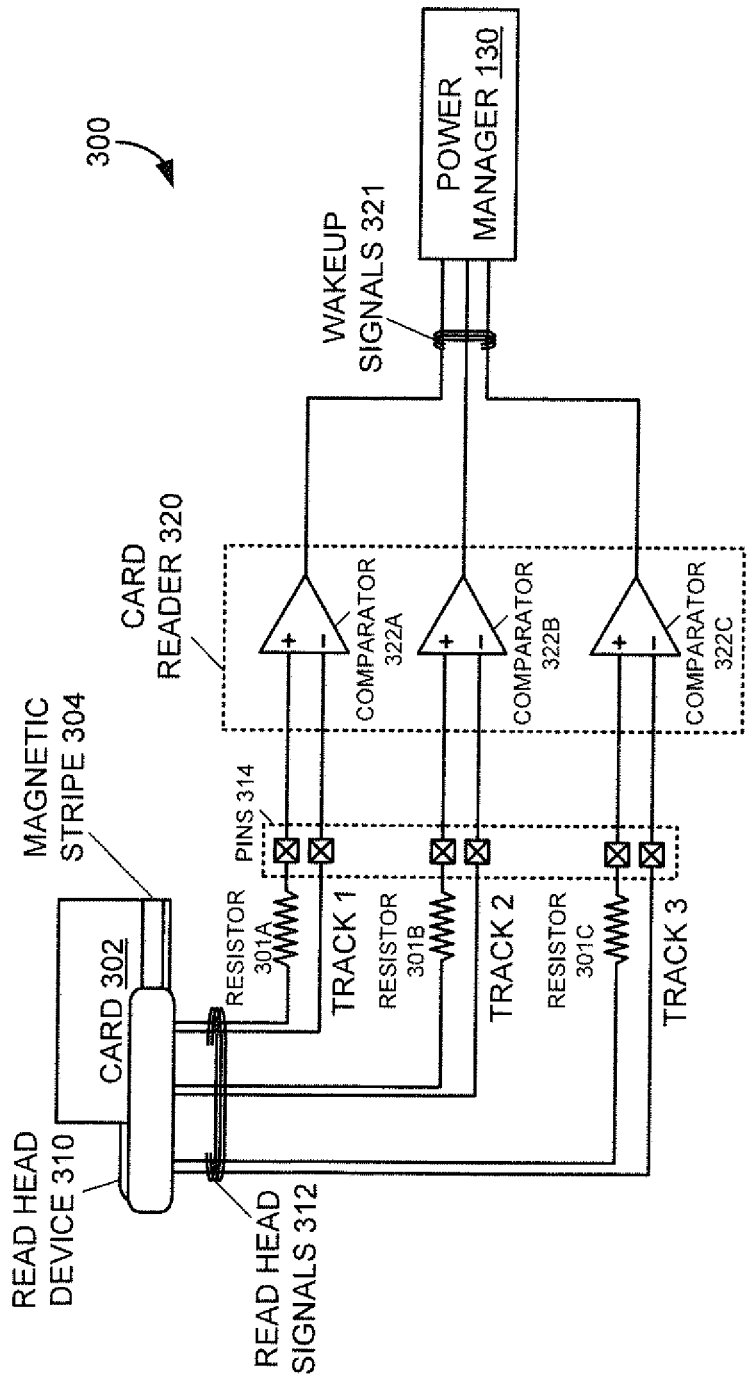
FIG. 3 is block diagram example of a swipe detection configuration for a card reader.

FIG. 3 is block diagram example of a swipe detection configuration for a card reader. Referring to FIG. 3, a magnetic card reading system 300 can include a read head device 310 to detect magnetic states encoded on a magnetic stripe 304 of a card 302. In some embodiments, the magnetic stripe 304 can include three magnetic tracks, each capable of storing data, for example, based on the encoded magnetic states. The read head device 310 can generate read head signals 312 based on the detected magnetic states encoded on the magnetic stripe 304 of the card 302. In some embodiments, the read head signals 312 can include multiple pairs of differential signals, for example, one pair for each track on the magnetic stripe 304. The read head device 310 can provide the read head signals to pins 314 of the magnetic card reading system 300, for example, with one line of each differential pair passing through a respective resistor 301A-301C. In some embodiments, the resistors 301A-301C can be a part of the analog gain devices 124A-124C in the active power mode, and may be optionally excluded from the swipe detection configuration for the magnetic card reading system 300.

The magnetic card reading system 300 can include a card reader 320 to receive the read head signals 312 from the read head device 310 via pins 314. The card reader 320 can be configured in a swipe detection configuration, for example, by an analog routing system, to detect an initiation of a swipe of the card 302 in the read head device 310 based on the read head signals 312. The card reader 320 in a swipe detection configuration can detect when a card swipe in the read head device 310 has been initiated, for example, based on changes in the read head signals 312 corresponding to the magnetic stripe 304 passing through the read head device 310. The card reader 320 can generate wakeup signals 321 that indicate whether the initiation of the swipe of the card 302 in the read head device 310 was detected. The card reader 320 can output the wakeup signals 321 to a power manager 130, for example, through a digital routing system. The wakeup signals 321 can prompt wake-up and reconfiguration of the card reader 320 into a data reading configuration. Embodiments of the card reader 320 in the data reading configuration will be described below in greater detail.

The card reader 320 can include multiple comparators 322A-322C, each of which can receive a different pair of read head signals 312, for example, corresponding to respective tracks of the magnetic stripe 304, via the pins 314. Each of the comparators 322A-322C can detect presence of the magnetic stripe 304 from the read head signals 312 during the initiation of card swipe, for example, by detecting a presence of a preamble in the magnetic stripe 304. In some embodiments, not all of the tracks in the magnetic stripe 304 may include data or a preamble, so when utilizing a comparator 322A-322C for each track the card reader 320 can detect the initiation of the card swipe by detecting the presence of any preamble in the magnetic stripe 304. By providing the read head signals 312 directly to the comparators 322A-322C, and bypassing the analog gain devices in the data reading configuration of the card reader 320, the card reader 320 can be utilized for a dual-function depending on its configuration, for example, as a swipe detector in a first configuration and as a data reading device in a second configuration.

Although FIGS. 1 and 3 show embodiments of card reader 100 and 300 in particular data reading configurations, in some embodiments, the card reader 100 and 300 can include different circuitry to read the magnetic states from a magnetic stripe during a swipe of the magnetic stripe, while still being able to reconfigure during low power mode(s) to reuse at least a portion of the different circuitry as a swipe detection mechanism during low power modes.

Figure 4:
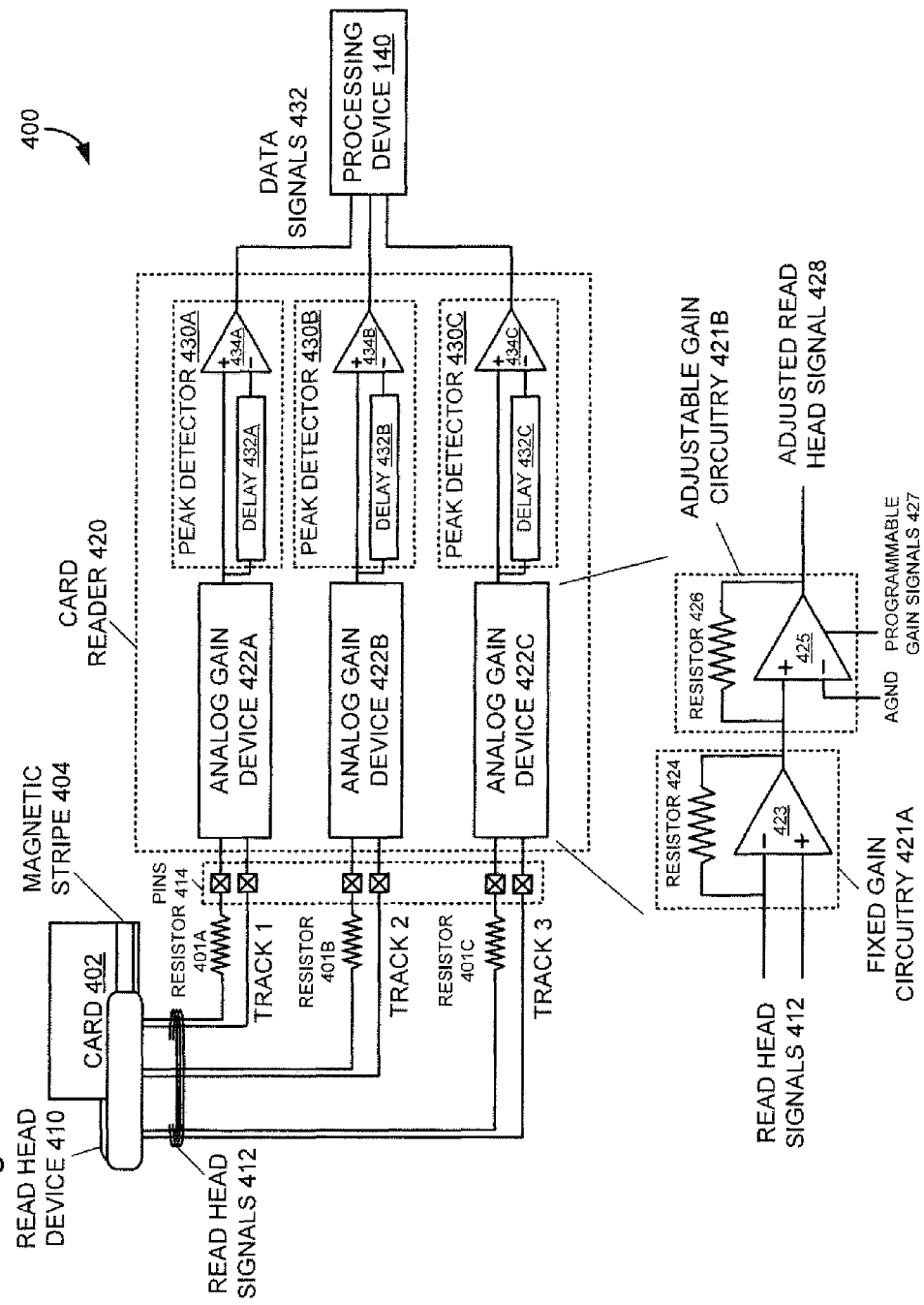
FIG. 4 is block diagram example of a magnetic stripe reading configuration for the card reader.

FIG. 4 is block diagram example of a data reading configuration for the card reader 420. Referring to FIG. 4, a magnetic card reading system 400 can include a read head device 410 to detect magnetic states encoded on a magnetic stripe 404 of a card 402. In some embodiments, the magnetic stripe 404 can include three magnetic tracks, each capable of storing data, for example, based on the encoded magnetic states. The read head device 410 can generate read head signals 412 based on the detected magnetic states encoded on the magnetic stripe 404 of the card 402. In some embodiments, the read head signals 412 can include multiple pairs of differential signals, for example, one pair for each track on the magnetic stripe 404. The read head device 410 can provide the read head signals to pins 414 of the system magnetic card reading system 400, for example, with one line of each differential pair passing through a respective resistor 401A-401C.

The magnetic card reading system 400 can include a card reader 420 to receive the read head signals 412 from the read head device 410 via pins 414. The card reader 320 can be configured in a data reading configuration, for example, by an analog routing system, to read data from the read head signals 412 that corresponds to data stored on the magnetic stripe 404 of the card 402. The card reader 420 can generate data signals 432 that include the data read from the read head signals 412, which correspond to data stored on the magnetic stripe 404 of the card 402. The card reader 420 can output the data signals 432 to a processing device 140, which can perform a variety of processing applications with the data. In some embodiments, the processing device 140 can initiate a reconfiguration of the card reader 420 into a swipe detection configuration in response to receiving the data corresponding to card swipe. Embodiments of the swipe detection configuration were described above with reference to FIGS. 1 and 3.

The card reader 420 can include multiple analog gain devices 422A-422C, for example, corresponding to each track of the magnetic stripe 404. The analog gain devices 422A-422C can adjust amplitudes of the corresponding read head signals 412, for example, to increase a dynamic range, allowing the card reader 420 the ability to read the data in the read head signals 412. Since the amplitudes of the read head signals 412 can be dependent on the swipe speed of the card 402, for example, faster swipe speeds produce read head signals 412 with a higher amplitude than slower swipe speeds, the analog gain devices 422A-422C can adjust the amplitudes of the read head signals 412 based on the card swipe speed. The analog gain devices 422A-422C can adjust the amplitudes of the read head signals 412 on a swipe-by-swipe basis or to adjust for swipe speed change during a single card swipe.

In some embodiments, the analog gain devices 422A-422C can fixed gain circuitry 421A and adjustable gain circuitry 421B. The fixed gain circuitry 421A can include an operational amplifier 423 and a resistor 424 (or switched capacitors acting as the resistor 424) configured to adjust the amplitude of the read head signals 412 by a preset gain value. The adjustable gain circuitry 421B can be a programmable gain amplifier (PGA), for example, which may include an operational amplifier 425 and a resistor 426 (or switched capacitors acting as the resistor 426) configured to adjust the amplitude of the output of the fixed gain circuitry 421A by a variable gain value to generate an adjusted read head signals 428. For example, the operational amplifier 425 can receive the output of the fixed gain circuitry 421A at a positive terminal, an analog ground voltage AGND at a negative terminal, and programmable gain signals 427. The operational amplifier 425 in combination with the resistor 426 can vary the gain applied to the output of the fixed gain circuitry 421A based on the programmable gain signals 427. In some embodiments, the magnetic card reading system 400 can include one or more analog-to-digital converters to monitor the read head signals 412 and generate the programmable gain signals 427 based on the amplitudes of the read head signals 412. For example, when the read head signals 412 drop below a preset threshold based on the swipe speed, the analog-to-digital converters can generate the programmable gain signals 427 to prompt the adjustable gain circuitry 421B to increase its gain and the resulting amplitude of the adjusted read head signals 428.

The card reader 420 can include multiple peak detectors 430A-430C, each of which can receive the adjusted read head signals 428 from respective analog gain devices 422A-422C. The peak detectors 430A-430C each can include a delay element 432A-432C and a comparator 434A-434C, each of which can receive the adjusted read head signals 428 from respective analog gain devices 422A-422C. The comparators 434A-434C can compare the adjusted read head signals 428 with a delayed version of the adjusted read head signals 428 from the respective delay elements 432A-432C to determine locations of peaks within the read head signals 412. The peak detectors 430A-430C can generate the data signals 432 based on the locations of the peaks within the read head signals 412 and output the data signals 432 to the processing device 140.

Figure 5:
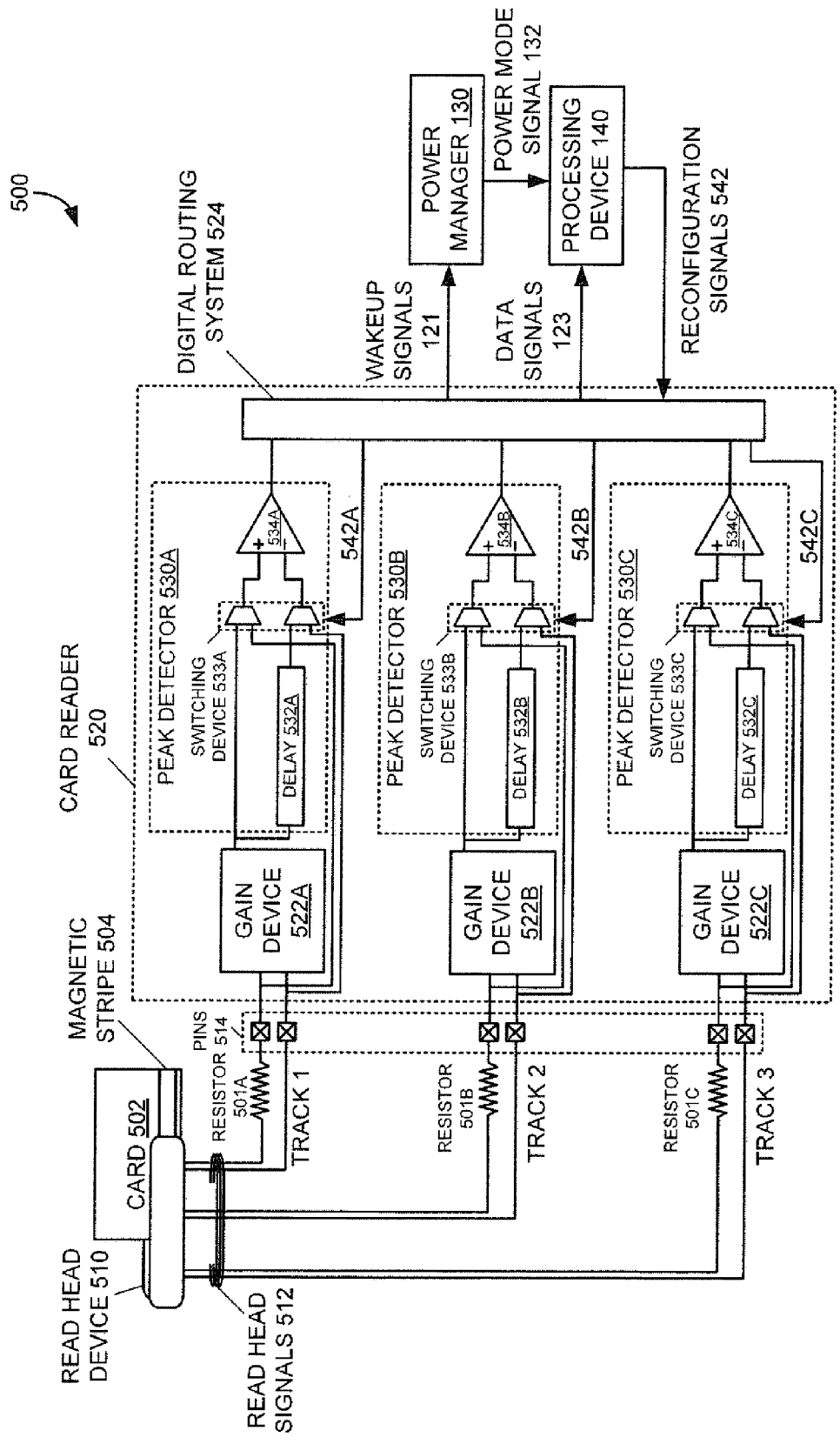
FIG. 5 is a block diagram example of another magnetic card reading system.

FIG. 5 is a block diagram example of another magnetic card reading system 500. Referring to FIG. 5, the magnetic card reading system 500 can include a read head device 510 to detect magnetic states encoded on a magnetic stripe 504 of a card 502. In some embodiments, the magnetic stripe 504 can include three magnetic tracks, each capable of storing data, for example, based on the encoded magnetic states. The read head device 510 can generate read head signals 512 based on the detected magnetic states encoded on the magnetic stripe 504 of the card 502. In some embodiments, the read head signals 512 can include multiple pairs of differential signals, for example, one pair for each track on the magnetic stripe 504. The read head device 510 can provide the read head signals to pins 514 of the system magnetic card reading system 500, for example, with one line of each differential pair passing through a respective resistor 501A-501C.

The magnetic card reading system 500 can include a card reader 520 to receive the read head signals 512 from the read head device 510 via pins 514. The card reader 420 can include multiple gain devices 522A-522C, for example, corresponding to each track of the magnetic stripe 504. The gain devices 522A-522C can adjust amplitudes of the corresponding read head signals 512, for example, to increase a dynamic range, allowing the card reader 520 the ability to read the data in the read head signals 512. Since the amplitudes of the read head signals 512 can be dependent on the swipe speed of the card 502, for example, faster swipe speeds produce read head signals 512 with a higher amplitude than slower swipe speeds, the gain devices 522A-522C can adjust the amplitudes of the read head signals 512 based on the card swipe speed. The gain devices 522A-522C can adjust the amplitudes of the read head signals 512 on a swipe-by-swipe basis or to adjust for swipe speed change during a single card swipe.

The card reader 420 can include multiple peak detectors 530A-530C, each of which can receive the adjusted read head signals from respective gain devices 522A-522C, and receive the read head signals 512 directly from the pins 514. The peak detectors 530A-530C can include switching devices 533A-533C to select inputs to comparators 534A-534C within the respective peak detectors 530A-530C depending on a configuration of the card reader 520. For example, in a swipe detection configuration, the switching devices 533A-533C can select the read head signals 512 directly from the pins 514 as the inputs to comparators 534A-534C. This configuration can allow the comparators 534A-534C to detect an initiation of a card swipe and generate wakeup signals 121.

In a data reading configuration, the switching devices 533A-533C can select the adjusted read head signals from respective gain devices 522A-522C as the inputs to comparators 534A-534C. In some embodiments, the peak detectors 530A-530C include a delay elements 532A-532C, which can delay the adjusted read head signals from respective gain devices 522A-522C. The comparators 534A-534C can compare the adjusted read head signals from respective gain devices 522A-522C with a delayed version of the adjusted read head signals from the respective delay elements 532A-532C to determine locations of peaks within the read head signals 512. This configuration can allow the peak detectors 530A-530C to generate data signals 123 based on the locations of the peaks within the read head signals 512.

The card reader 520 can include a digital routing system 524 to selectively output the wakeup signals 121 to the power manager 130 and output the data signals 123 to the processing device 140, depending on which of the signals 121 and 123 the card reader 520 generates based on its configuration. The power manager 130, in response to the wakeup signals 121 can generate a power mode signal 132, which can be output to the processing device 140. The processing device 140 can generate reconfiguration signals 542, which can be provided to the switching devices 533A-533C in the peak detectors 530A-530C. The switching devices 533A-533C can select the inputs to the comparators 534A-534C based on the reconfiguration signals 542. For example, the reconfiguration signals 542 can place the card reader 520 in swipe detection configuration or a data reading configuration by prompting the switching devices 533A-533C to select particular inputs to the comparators 534A-534C. In some embodiments, the processing device 140 can provide the reconfiguration signals 542 to the switching devices 533A-533C in the peak detectors 530A-530C via the digital routing system 524.

In some embodiments, the processing device 140 can generate the reconfiguration signals 542 in response to certain events. For example, the processing device 140 can generate reconfiguration signals 542 that can place the card reader 520 in a data reading configuration in response to the power mode signal 132 from the power manager 130. The processing device 140 can determine to generate reconfiguration signals 542 that can place the card reader 520 in a swipe detection configuration after receiving the data signals 123, or in response to an indication that the card swipe has ended. This indication can be explicit from the card reader 520 or read head device 510, or implicit after a predetermined time of not receiving additional data from the card reader 520, for example, by not receiving additional data signals 123.

Figure 6:
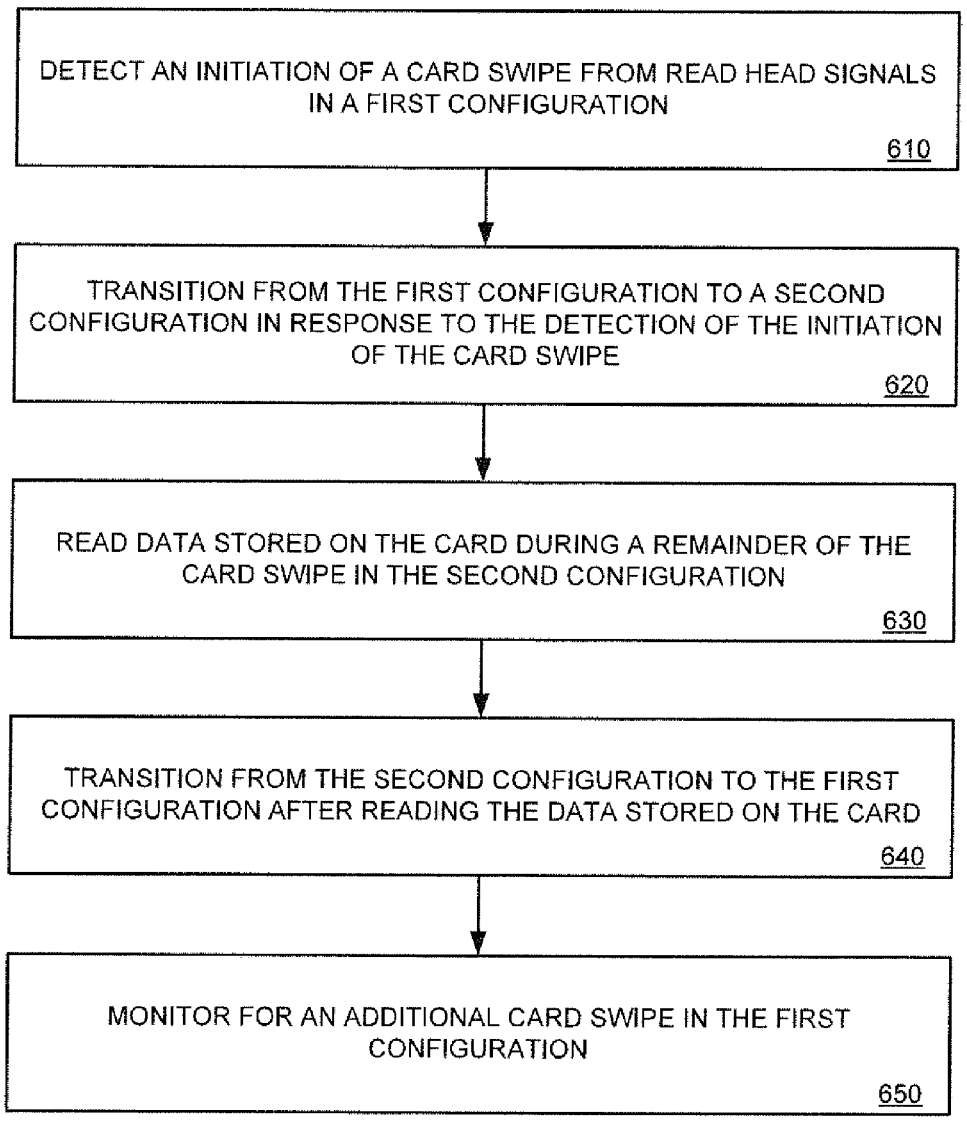
FIG. 6 is an example operational flowchart for reconfiguration of a magnetic card reading system.

FIG. 6 is an example operational flowchart for reconfiguration of a magnetic card reading system. Referring to FIG. 6, in a block 610, a card reader can detect an initiation of a card swipe from read head signals in a first configuration. In the first configuration, the card reader can directly couple comparators in its peak detector to directly receive the read head signals from a read head device. In some embodiments, the card reader can generate wakeup signals in response to detecting the initiation of the card swipe, which can be provided to a power manager. The power manager can generate a power mode signal in response to the wakeup signals and provide the power mode signal to a processing device.

In a block 620, the card reader can transition from the first configuration to a second configuration in response to the detection of the initiation of the card swipe. In some embodiments, the processing device can generate reconfiguration signals in response to the power mode signal, which can prompt the transition of the card reader from the first configuration to a second configuration. In some embodiments, the processing device can wake-up other portions of the system, such as analog blocks, in response to the power mode signal from the power manager. The second configuration can be a data reading configuration, which can allow the card reader to read data from the read head signals.

In a block 630, the card reader can read data stored on the card during a remainder of the card swipe in the second configuration. The card reader can receive the read head signals and read the data from the read head signals. In some embodiments, the card reader can adjust an amplitude of the read head signals, for example, based on the swipe speed of the card, and then compare the adjusted read head signals to a delayed version of the adjusted read head signals to detect peaks in the read head signals. Since the locations of the peak correspond to a binary data value, the card reader can output data signals that represent a bit stream corresponding to the data stored on the card.

In a block 640, the card reader can transition from the second configuration to the first configuration after reading the data stored on the card. The processing device can generate reconfiguration signals, which can prompt the transition of the card reader from the second configuration back into the first configuration. In some embodiments, the processing device can generate reconfiguration signals based on a decision to transition the card reader into a low power operational state. This decision may be made by the processing device based on an identification that the card swipe has concluded, for example, by explicit signaling from the card reader or read head device or implicitly determined by a lack of additional data from the card reader.

In a block 650, the card reader can monitor for an additional card swipe in the first configuration. In some embodiments, the comparators in the card reader can be directly coupled to receive the read head signals from the read head device in the first configuration, which can allow the comparators to trip in response to a presence of a magnetic stripe in the read head device.

Figure 7:
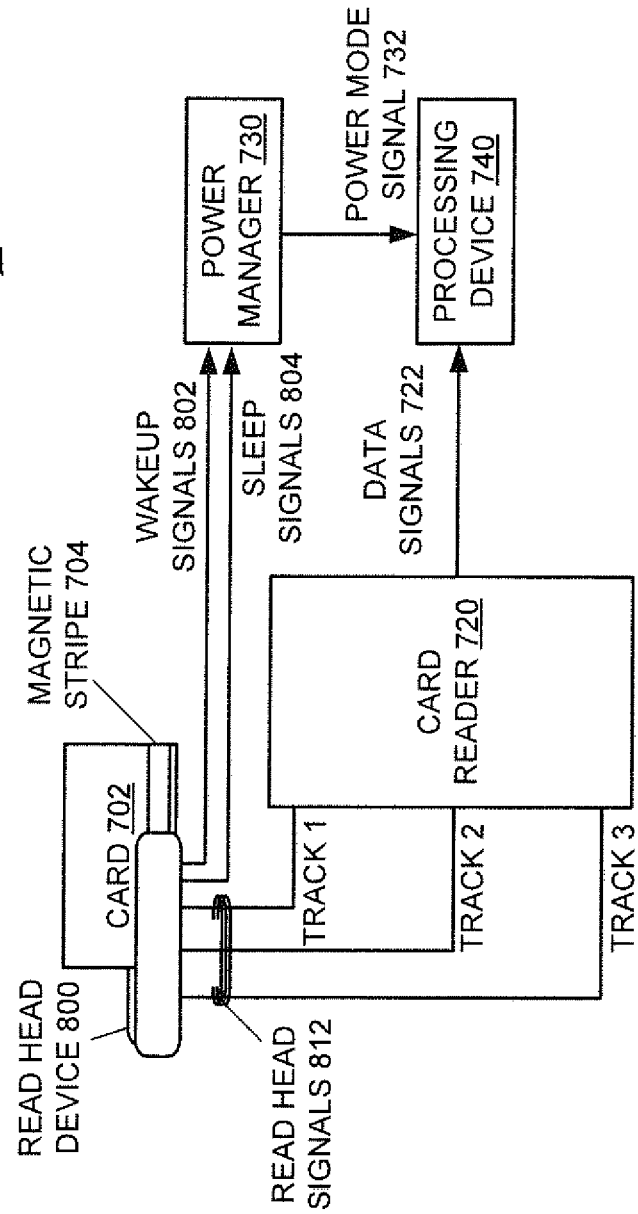
FIG. 7 is a block diagram example of yet another magnetic card reading system.

FIG. 7 is a block diagram example of yet another magnetic card reading system 700. Referring to FIG. 7, the magnetic card reading system 700 can include a read head device 800 to detect magnetic states encoded on a magnetic stripe 704 of a card 702. In some embodiments, the magnetic stripe 704 can include three magnetic tracks, each capable of storing data, for example, based on the encoded magnetic states. The read head device 800 can generate read head signals 812 based on the detected magnetic states encoded on the magnetic stripe 704 of the card 702. Although FIG. 1 shows the magnetic stripe 704 being located on a card 702, in some embodiments, the magnetic stripe 704 can be located on any medium capable of being read by the read head device 800.

The magnetic card reading system 700 can include a card reader 720 to receive the read head signals 812 from the read head device 800. The card reader 720 can operate in multiple operational modes, such as a normal operating mode and a low power operating mode. In the normal operating mode, the card reader 720 can read data stored on the card from the read head signals 812 generated during the card swipe. In some embodiments, the card reader 720 can utilize the read head signals 812 to ascertain data stored on the magnetic stripe 704 of the card 702 and generate the data signals 722 corresponding to the data read by the card reader 720.

The card reader 720 can output the data signals 722 to a processing device 740, which can store and/or process the data signals 722 depending on an application implemented by the processing device 740. For example, when the card 702 is a credit card, the data signals 722 can correspond to credit account information, which the processing device 740 can utilize to authenticate and/or authorize payment in a transaction. When the card 702 is a security card, the data signals 722 can corresponding to user access information, which the processing device 740 can utilize to authenticate and/or authorize a user for access to a secure location or resource.

The processing device 740 can prompt the card reader 720 to transition into a low power mode, for example, after having received the data signals 722 from the card reader 720. In some embodiments, the processing device 740 can alter a power supply provided to the card reader 720 during or after the operational mode transition.

The read head device 800 can be configured to detect a presence of an object, such as the card 702 in the read head device 800, which can indicate an initiation of a swipe of the card 702. In some embodiments, the read head device 800 can detect an insertion of the card 702 in the read head device 800 as the initiation of a swipe of the card 702. The read head device 800 can generate wakeup signals 802 that indicate the initiation of the swipe of the card 702 in response to the read head device 800 detecting the presence of the object in the read head device 800. Embodiments of the read head device 800 will be described below in greater detail.

The read head device 800 can output the wakeup signals 802 to a power manager 730, which can generate a power mode signal 732 in response to the wakeup signals 802. The processing device 740, in response to the power mode signal 732, can initiate a transition of the card reader 720 from the low power state to the normal operating mode in order to allow the card reader 720 to read data stored on the card 702 during the remainder of the card swipe. In some embodiments, the processing device 740 can alter the power supply provided to the card reader 720 during or after the operational mode transition. In some embodiments, the card reader 720 can directly change between the normal operating mode and the low power mode, while in other embodiments, the card reader 720 can transition to intermediate states or modes, such as a reset mode, while changing between the normal operating mode and the low power mode.

The read head device 800 can detect a removal of the object, such as the card 702 in the read head device 800, from the read head device 800. The read head device 800 can generate sleep signals 804 that can indicate an end of the swipe of the card 702 in response to the read head device 800 detecting the removal of the object from the read head device 800. The read head device 800 can output the sleep signals 804 to the power manager 730, which can generate the power mode signal 732 in response to the sleep signals 804. The processing device 740, in response to the power mode signal 732, can initiate a transition of the card reader 720 from the normal operating mode to the low power state. In some embodiments, the processing device 740 can alter the power supply provided to the card reader 720 during or after the operational mode transition.

Figure 8A:
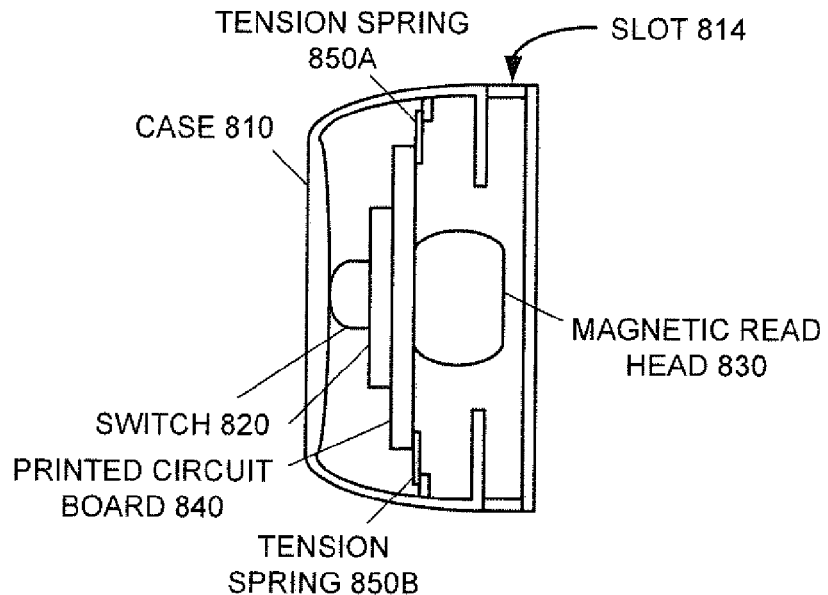
FIGS. 8A-8B are block diagrams of an example read head device shown in FIG. 7.
Figure 8B:
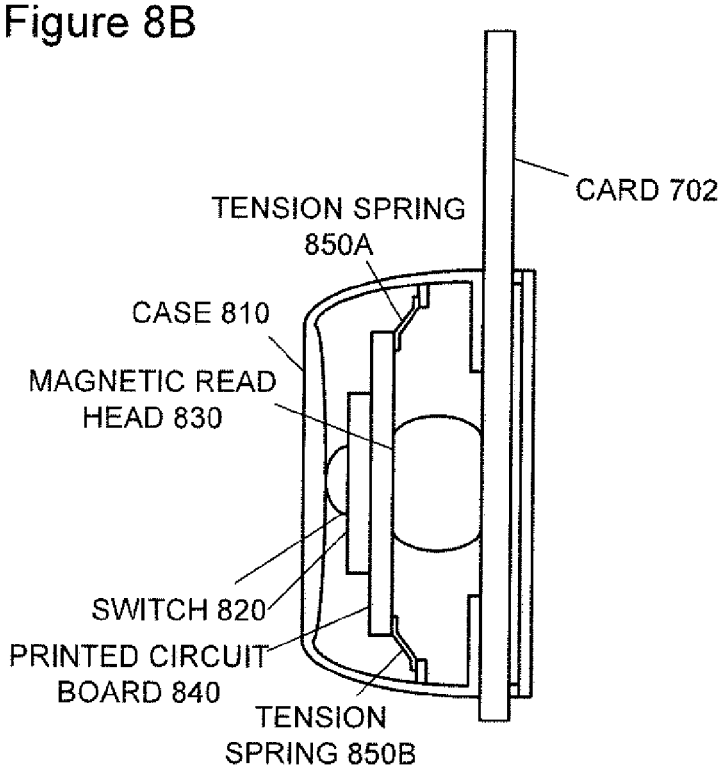

FIGS. 8A-8B are block diagrams of an example read head device shown in FIG. 7. Referring to FIGS. 8A and 8B, the read head device can include a case 810 having a slot 814 to receive a magnetic stripe, such as magnetic stripe in the card 702. The read head device can include a magnetic read head 830 to read magnetic states stored in the magnetic stripe and generate read head signals 812 based on the magnetic states stored in the magnetic stripe.

The magnetic read head 830 can couple to the case 810, for example, via a printed circuit board 840 and tension springs 850A and 850B. The printed circuit board 840 can couple to or contact a switch 820, which can selectively activate based on a location of the magnetic read head 830 relative to the case 810. The magnetic read head 830 can be located in a first position, for example, at least partially located in the slot 814 formed in the case 810, and the switch 820 can be in a first state. When the card 702 is inserted into the slot 814 formed in the case 810, the card 720 can move the magnetic read head 830 into a second position and transition the switch 820 into a second state, for example, activating the switch 820. In some embodiments, the read head device can generate the wakeup signals 802 in response to the activation of the switch 820.

When the card 702 is removed from the slot 814 formed in the case 810, for example, after a swipe of the magnetic stripe across the magnetic read head 830, the magnetic read head 830 can move back to the first position and the switch 820 can transition to the first state, for example, deactivating the switch 820. In some embodiments, the read head device can generate the sleep signals 804 in response to the deactivation of the switch 820. The tension springs 850A and 850B can allow the magnetic read head 830 to move between the first and second positions, while also allowing the magnetic read head 830 to remain coupled to the case 810 via the printed circuit board 840.

Figure 9A:
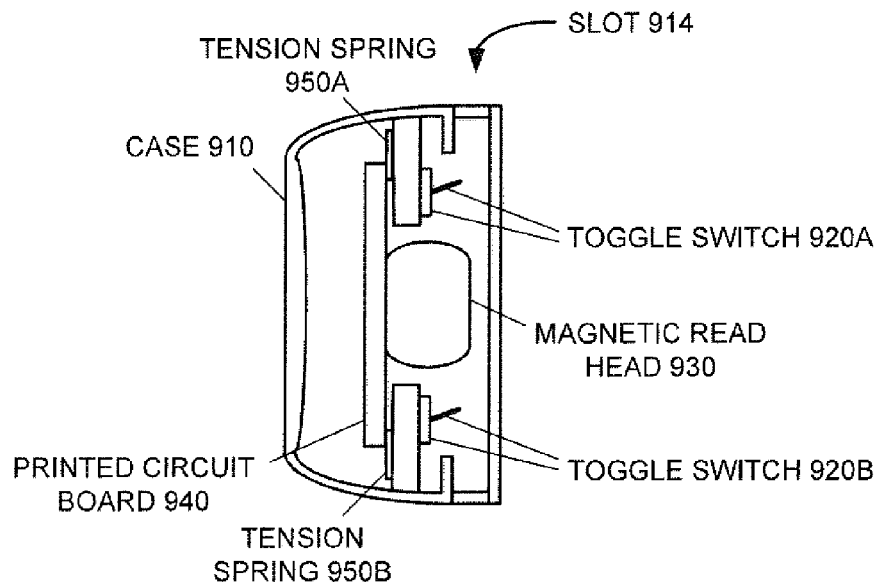
FIGS. 9A-9B are block diagrams of another example read head device shown in FIG. 7.
Figure 9B:
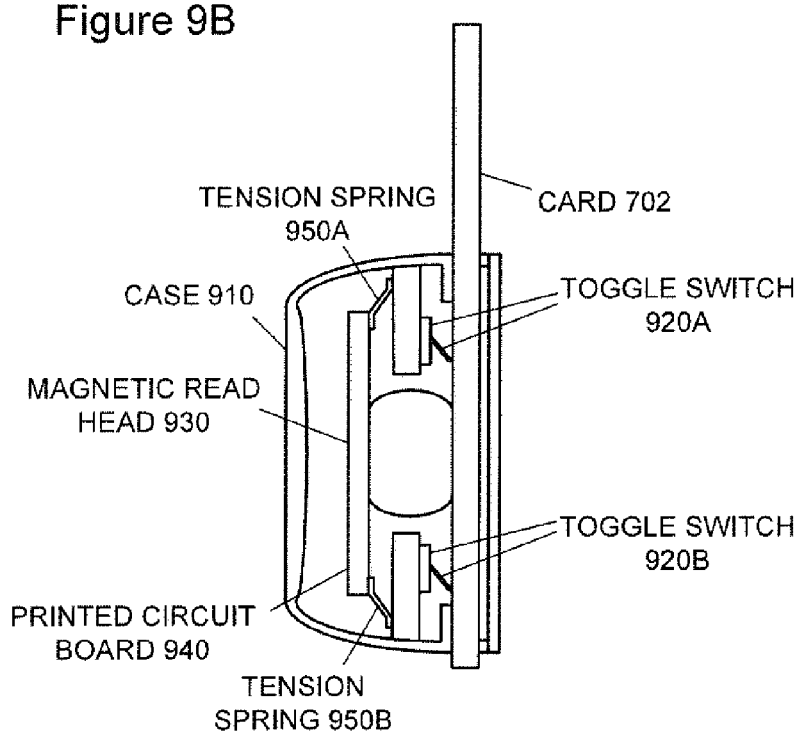

FIGS. 9A-9B are block diagrams of another example read head device shown in FIG. 7. Referring to FIGS. 9A and 9B, the read head device can include a case 910 having a slot 914 to receive a magnetic stripe, such as magnetic stripe 704 in the card 702. The read head device can include a magnetic read head 930 to read magnetic states stored in the magnetic stripe and generate read head signals 812 based on the magnetic states stored in the magnetic stripe.

The magnetic read head 930 can couple to the case 910, for example, via a printed circuit board 940 and tension springs 950A and 950B. The tension springs 950A and 950B can allow the magnetic read head 930 to move and maintain contact with the magnetic stripe 704 during a card swipe, while also allowing the magnetic read head 930 to remain coupled to the case 910 via the printed circuit board 940.

The read head device can include one or more toggle switches 920A and 920B, which can selectively activate, for example, when the toggle switches 920A and 920B contact the card 702 or other object present in the slot 914. The toggle switches 920A and 920B can be set in a first position, for example, at least partially located in the slot 914 formed in the case 910. When the card 702 is inserted into the slot 914 formed in the case 910, the card 720 can move the toggle switches 920A and 920B into a second position, for example, activating the toggle switches 920A and 920B. In some embodiments, the timing of the activation of the toggle switches 920A and 920B can indicate an initiation of a card swipe in the read head device. For example, the toggle switches 920A and 920B can be located towards different ends of the slot 914, which can allow for different activation times of the toggle switches 920A and 920B when a card 702 being swiped through the slot 914. The read head device can detect the activations of both the toggle switches 920A and 920B and determine whether the activation of the toggle switches 920A and 920B corresponds to a card swipe based on the activation times of the toggle switches 920A and 920B. The read head device can generate the wakeup signals 802 in response to the activation of the toggle switches 920A and 920B.

When the card 702 is removed from the slot 914 formed in the case 910, for example, after a swipe of the magnetic stripe across the magnetic read head 930, the toggle switches 920A and 920B can move back to the first position, for example, deactivating the toggle switches 920A and 920B. In some embodiments, the read head device can generate the sleep signals 804 in response to the deactivation of the toggle switches 920A and 920B.

Figure 10:
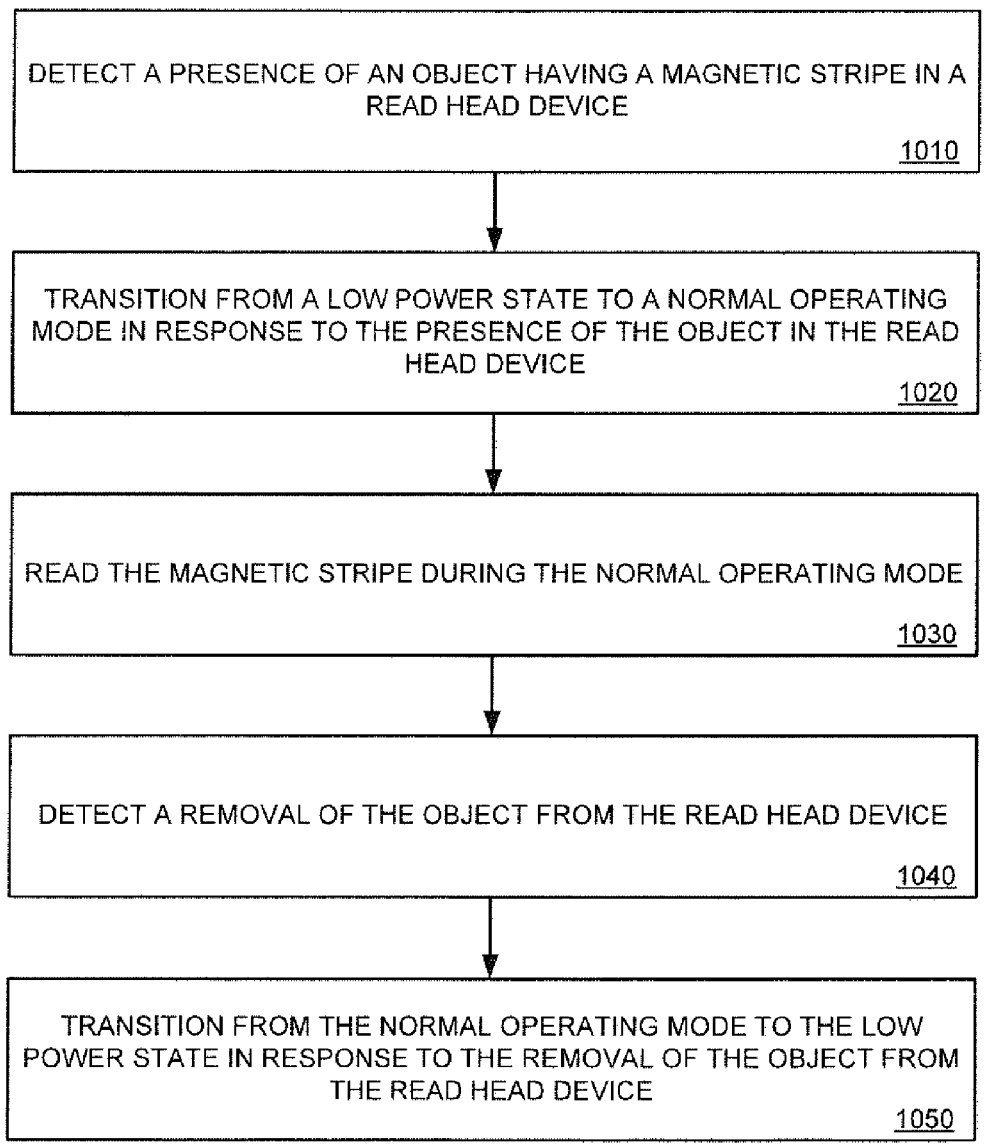
FIG. 10 is an example operational flowchart for operation of the magnetic card reading system shown in FIG. 7.

FIG. 10 is an example operational flowchart for operation of the magnetic card reading system shown in FIG. 7. Referring to FIG. 10, in a block 1010, the magnetic card reading system can detect a presence of an object having a magnetic stripe in a read head device. The magnetic card reading system can include a switching device having multiple states, such as an activation state and a deactivation state, which can be set based on a presence of the object in the read head. For example, the switching device can be activated and deactivated in response to direct contact with the object, such as when the object enters a slot in the magnetic card reading system. In some embodiments, the presence or removal of the object can move a magnetic read head in the read head device, which can cause the switching device to be activated and deactivated.

In a block 1020, the magnetic card reading system can transition a card reader from a low power state to a normal operating mode in response to the presence of the object in the read head device. In some embodiments, the read head device can generate wakeup signals in response to a detection of the object in the read head device, which can prompt the card reader to transition into the normal operating mode from the low power state. For example, the magnetic card reading system can include a power manager to receive the wakeup signals from the read head device and to prompt a processing device to transition the card reader into the normal operating mode from the low power state.

In a block 1030, the magnetic card reading system can read the magnetic stripe during the normal operating mode. In some embodiments, the read head device can generate read head signals corresponding to magnetic states on the magnetic stripe, for example, as the magnetic stripe is swiped across the magnetic read head. The card reader, in the normal operating mode, can generate a data signal from the read head signals. The data signal can include data corresponding to the magnetic states on the magnetic stripe.

In a block 1040, the magnetic card reading system can detect a removal of the object from the read head device. As discussed above, the switching device can detect the removal of the object from the read head device.

In a block 1050, the magnetic card reading system can transition the card reader from the normal operating mode to the low power state in response to the removal of the object from the read head device. In some embodiments, the read head device can generate sleep signals in response to removal of the object from the read head device, which can prompt the card reader to transition from the normal operating mode into the low power state. For example, the magnetic card reading system can include a power manager to receive the sleep signals from the read head device and to prompt a processing device to transition the card reader from the normal operating mode into the low power state.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

One of skill in the art will recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

What is claimed is:

1. An apparatus comprising:
    a reconfigurable stripe reader comprising gain circuitry and a comparator, the reconfigurable stripe reader configured to receive read head signals corresponding to a track of a magnetic stripe, the reconfigurable stripe reader having a first configuration with a first routing of the read head signals configured to detect an initiation of a swipe of the magnetic stripe from the read head signals and having a second configuration with a second routing of the read head signals configured to read data stored on the track of the magnetic stripe from the read head signals during the swipe of the magnetic stripe, wherein the reconfigurable stripe reader is operable in the first configuration to detect the initiation of the swipe before transitioning to operation in the second configuration, wherein in the second configuration the gain circuitry is configured to boost the read head signals captured during the swipe of the magnetic stripe and the comparator is configured to read the data stored on the magnetic stripe based on the boosted read head signals, and wherein in the first configuration, the reconfigurable stripe reader is configured to bypass the gain circuitry and provide the read head signals to the comparator.

2. The apparatus of claim 1, wherein the reconfigurable stripe reader is configured to transition from the first configuration to the second configuration in response to the detection of the initiation of the swipe of the magnetic stripe.

3. The apparatus of claim 1, wherein the reconfigurable stripe reader, in the first configuration, is configured to output a wakeup signal to a power manager in response to the detection of the initiation of the swipe of the magnetic stripe.

4. The apparatus of claim 3, wherein the power manager is configured to prompt reconfiguration of the reconfigurable stripe reader from the first configuration into the second configuration in response to the wakeup signal.

5. The apparatus of claim 1, wherein the reconfigurable stripe reader, in the second configuration, is configured to output a data signal configured to identify the data stored on the magnetic stripe to a processing device.

6. A method comprising:
    detecting, by a stripe reader, an initiation of a swipe of a magnetic stripe from read head signals corresponding to a track of the magnetic strip when the stripe reader is in a first configuration having a first routing of the read head signals in the stripe reader;
    after detecting the initiation of the swipe of the magnetic stripe transitioning, by the stripe reader, from the first configuration to a second configuration having a second routing of the read head signals in the stripe reader in response to the detection of the initiation of the swipe of the magnetic stripe, wherein the second configuration includes the second routing to route the read head signals to gain circuitry to boost the read head signals and to a comparator to read the data stored on the magnetic strip based on the boosted read head signals, wherein the first configuration includes the first routing to route the read head signals to the comparator such that the read head signals bypass the gain circuitry; and
    reading, by the stripe reader, data stored on the track of the magnetic stripe during a remainder of the swipe of the magnetic stripe in the second configuration.

7. The method of claim 6 further comprising:
    transitioning, by the stripe reader, from the second configuration to the first configuration after reading the data stored on the magnetic stripe; and
    monitoring, by the stripe reader, for an additional swipe of the magnetic stripe in the first configuration.

8. The method of claim 6 further comprising outputting, by the stripe reader in the first configuration, a wakeup signal to a power manager in response to detecting initiation of the swipe, wherein the power manager is configured to alert a processing device to transition out of a low power mode in response to the wakeup signal.

9. The method of claim 8, wherein transitioning from the first configuration to the second configuration is performed in response to reconfiguration signals from the processing device during the transition out of the low power mode.

10. The method of claim 6, wherein reading data stored on the magnetic stripe further comprises:
adjusting, by the stripe reader, a magnitude of the read head signals; and
detecting, by the stripe reader, peaks in the adjusted read head signals, which correspond to the data stored on the magnetic stripe.

11. The method of claim 6 further comprising outputting, by the stripe reader in the second configuration, a data signal to a processing device.

12. The method of claim 6 further comprising transitioning, by the stripe reader, from the second configuration to the first configuration in response to reconfiguration signals from a processing device after the output of the data signal to the processing device.

13. An apparatus comprising:
a read head device configured to read head signals corresponding to magnetic states of a track of a magnetic stripe;
gain circuitry;
a comparator; and
a card reader having a lower power operating mode with a first routing of the read head signals configured to generate, from the read head signals, a wake up signal in response to detecting an initiation of a swipe of the magnetic stripe, the card reader configured to transition from the lower power operating mode to a higher power operating mode in response to the wakeup signal, the higher power operating mode with a second routing of the read head signals configured to generate a data signal including data corresponding to the magnetic states of the track from the read head signals-during the swipe of the magnetic stripe, wherein the card reader in the lower power operating mode is configured to detect the initiation of the swipe before the transition to the higher power operating mode, wherein in higher power operating mode the read head signals are routed to the gain circuitry to boost the read head signals captured during the swipe of the magnetic stripe and routed to the comparator to read the data stored on the magnetic stripe based on the boosted read head signals, and wherein in the lower power operating mode, the read head signals are routed to the comparator such that the read head signals bypass the gain circuitry.

14. The apparatus of claim 13, wherein the read head device is configured to detect the presence of the object having the magnetic stripe in the read head device.

15. The apparatus of claim 13, wherein the wakeup signal is configured to indicate an initiation of a swipe of the magnetic stripe.

16. The apparatus of claim 13, wherein the read head device is configured to generate a sleep signal in response to a removal of the object having the magnetic stripe from the read head device.

17. The apparatus of claim 16, wherein the card reader is configured to transition from the higher power operating mode to the lower power operating mode in response to the sleep signal.

18. The apparatus of claim 13, wherein the read head device further comprising:
a magnetic read head configured to generate the read head signals corresponding to the magnetic states on the magnetic stripe; and
a switching device configured to detect whether the object having the magnetic stripe is present in the read head device based on a position of the magnetic read head in the read head device.

* * * * *